June 16, 1936.  R. SCHMIDT  2,044,333
MARKING SOUND AND MOVING PICTURE FILM
FOR THE PURPOSE OF SYNCHRONIZATION
Filed May 27, 1930
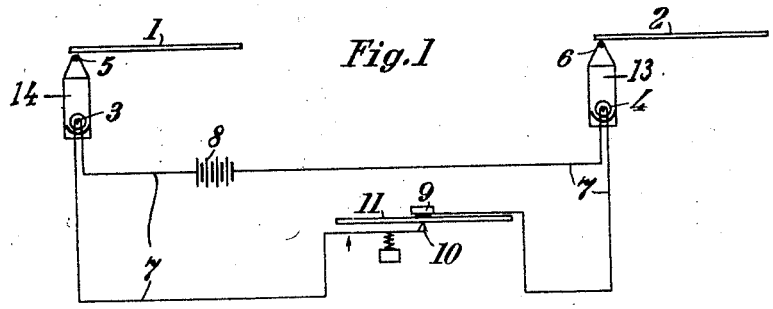
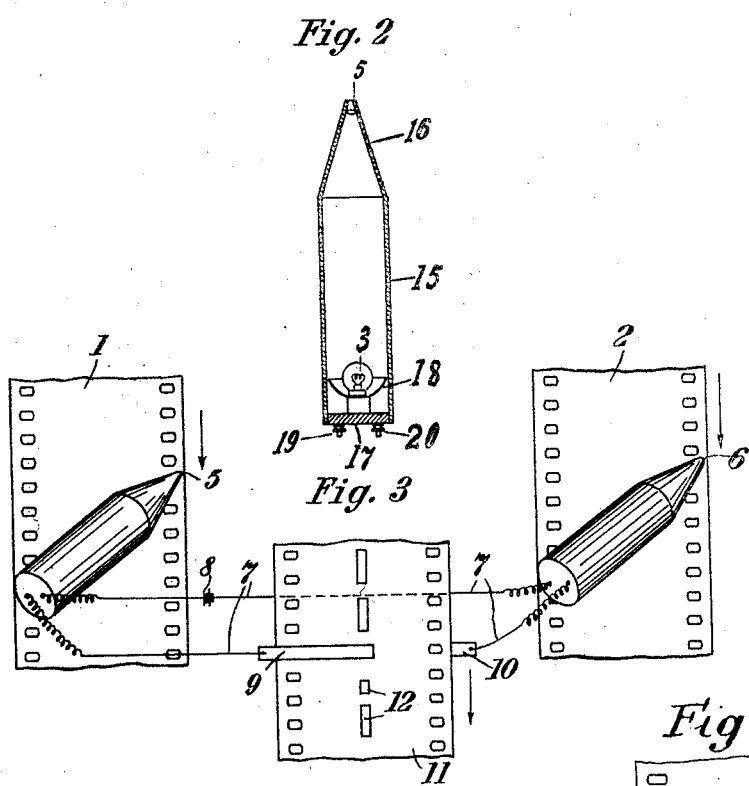
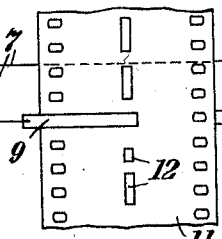
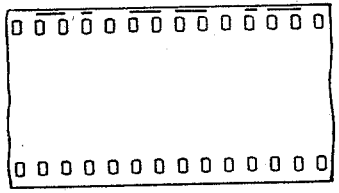
Inventor:
Richard Schmidt,
By Philip S. Hopkins,
Attorney.

Patented June 16, 1936

2,044,333

UNITED STATES PATENT OFFICE 2,044,333

MARKING SOUND AND MOVING PICTURE FILM FOR THE PURPOSE OF SYNCHRONIZATION

Richard Schmidt, Dessau in Anhalt, Germany, assignor to Agfa Ansco Corporation, Binghamton, N. Y., a corporation of New York Application May 27, 1930, Serial No. 456,173
In Germany June 5, 1929

3 Claims. (Cl. 88—16.2)

The present invention relates to a process of marking sound and moving picture films for the purpose of synchronization. Another object is a device suitable for the said process. Further objects of my invention will be seen from the detailed specification following hereafter.

According to my present invention synchronization marks are produced on the margins of the picture film and of the film on which the sound waves are recorded during photographing the scene and the action of the actors by marking devices of a simple construction which both for the sound film and the moving picture film are controlled by a separate mechanism outside of the view taking and the sound recording apparatus.

My synchronizing process may practically be carried out in the following manner.

In the picture taking camera and in the sound recording camera a small incandescent lamp is arranged in a small casing having a perforation through which the lamp projects a luminous spot on the margin of the film, between the edge and the perforations. When the apparatus stands still, that means, when no exposure is made, the said perforation in the light-casing is covered by a shutter controlled, for instance, by an electromagnet. The electromagnet is intermittently energized by a mechanism running during the exposure at any suitable speed, for instance, by a film having at certain distances apart electric contacts of suitable form.

In a simpler embodiment of my invention, the use of a shutter device in the lamp casings is dispensed with and the lamps are simultaneously controlled by a separate mechanism of the kind described.

The markings produced on the margins of the sound picture films during the recording process are, for instance, dots and dashes of the kind used in the Morse code. Each combination of dots and dashes signifies a letter. As the marking devices of the moving picture and the sound film are connected in series, the completely simultaneous production of the synchronizing markings is guaranteed. The synchronizing markings may be produced on one or both margins of the films. By using the Latin alphabet, about 625 letter combinations are possible. This suffices, when there is a distance of ½ m. between the synchronization marks, for marking 300 m. of film, that is to say, the maximum length of a film roll. Of course, it is also possible to subdivide the letter combinations, for instance, by dot marks at a distance apart of 10 cm.

Preferably, I substitute for the dots uncircular marks, for instance, in the form of an isosceles triangle, an arrow-head or the like which with their particularly characteristic side, that is to say, with the vertex of the triangle or the arrow-tip show in the direction in which the film runs. If the manner of arranging these markings is fixed once for all, the operator knows immediately when looking at a film strip thus marked, in which direction the pictures run on the film, and in which direction the markings must be read. Without this indication of the direction by the markings, the danger always exists that they are read in false direction, so that, for instance, the marking . _ _ is taken for the sign _ _ . and vice versa.

My invention offers the advantage that the marking device in the picture and sound recording apparatus is extremely small. Furthermore, the parts that move are restricted to a minimum and, finally, by simultaneously controlling both illuminating devices failure in synchronization becomes impossible. Any number of picture and sound recording means may be controlled at the same time.

Instead of marking by light, marking by pressure may be adopted.

An embodiment of my invention is illustrated in the accompanying drawing in which Figs. 1 and 3 show diagrammatically the arrangement of the different parts of my device for recording synchronization marks simultaneously on the picture film and on the sound recording film.

Fig. 2 shows in section one form of a light-casing used in my device, and

Fig. 4 a film strip bearing synchronization marks produced according to my process. The same reference characters are used in the different figures to indicate the same parts.

Fig. 5 shows a film strip provided with identification marks in Morse code, the dots being irregularly shaped and indicating the direction in which the record on the film band runs.

In Figs. 1 and 3 I is a cinematographic film band running in a cinematographic apparatus for taking the moving pictures, and 2 is the film band on which in a suitable apparatus known in the art, the sounds are to be recorded. For the sake of clarity, the cinematographic apparatus and the sound recording machine are omitted. In front of each of these films a casing 13, 14 of tube-like form and closed on one end with a funnel-like cover is arranged provided with an incandescent lamp 3 and 4. The small openings 5, 6 of the funnel-like extension of the casings are directed towards the margins of the films outside of the perforations. In a separate device independent from the cinematographic and the sound recording apparatus runs during exposure a film band 11 made from paper or celluloid which is moved in the same manner as a cinematographic film. This film band 11 controlling the illumination of the lamps 3 and 4 is provided in its longitudinal direction with openings 12 of rectangular form of different length. Both lamps 3 and 4 are connected with a circuit 7 and a cell 8, 9 and 10 are contacts separated by the film 11. When the film 11 runs in its longitudinal direction, the circuit 7 is closed if an opening 12 appears between the contacts 9 and 10. In this manner, synchronic current pulsations are produced in the lamps 3 and 4 which are recorded on the film bands after developing in form of black dots and dashes.

In order to substitute for the dots uncircular markings, the openings 5 and 6 of the casings 13, 14 may be altered, for instance, by inserting a diaphragm with a corresponding angular opening.

The light casing seen in Fig. 2 comprises a tube 15 with a funnel-like extension 16, on the opening 5 of which, if necessary, a lens or a diaphragm may be inserted. The other end of the tube is closed by a cover 17 bearing the incandescent lamp 3, a mirror 18 and the contacts 19 and 20.

Various modifications and changes in details of construction and arrangement of parts are possible. Thus, for instance, the current pulsations illuminating the lamps 3 and 4 may be controlled by a rotating disc provided with contacts the length of which corresponds to the openings 12 of the film band 11. All these modifications and substitution of equivalents are considered to be within the spirit of the invention and the scope of the following claims.

What I claim is:—

1. Moving picture film strip and sound track film strip being synchronized by reference characters formed of dots and dashes in Morse code manner applied to corresponding spots on the margins of both strips the distance between two consecutive characters being subdivided by uniform dot marks disposed at regular intervals.

2. Moving picture film strip and sound track film strip being synchronized by reference characters formed of dots and dashes in Morse code manner applied to corresponding spots on the margins of both strips, the dots having an irregular shape indicating the direction in which the records on the film band run.

3. Moving picture film strip and sound track film strip being synchronized by reference characters formed of dots and dashes in telegraph code manner applied to corresponding spots on the margins of both strips.

RICHARD SCHMIDT.